United States Patent [19]

Roberts

[11] Patent Number: 4,582,176
[45] Date of Patent: Apr. 15, 1986

[54] LOCKABLE CHOCK FOR DUAL WHEELS OF VEHICLE

[75] Inventor: D. Carlton Roberts, Stokesdale, N.C.

[73] Assignee: Burlington Industries, Inc., Greensboro, N.C.

[21] Appl. No.: 633,277

[22] Filed: Jul. 23, 1984

[51] Int. Cl.$^4$ ............................................. B60T 3/00
[52] U.S. Cl. ......................................... 188/32; 70/226
[58] Field of Search ................... 70/225, 226; 188/32, 188/36

[56] References Cited

U.S. PATENT DOCUMENTS

| | | | |
|---|---|---|---|
| 3,581,846 | 6/1971 | Janus | 188/32 |
| 3,687,238 | 8/1972 | Carpenter | 188/32 |
| 3,700,077 | 10/1972 | Harder | 188/32 |
| 3,734,241 | 5/1973 | Hale | 188/32 |
| 4,031,983 | 6/1977 | Lentini | 188/32 |
| 4,399,893 | 8/1983 | Switzer | 188/32 |

FOREIGN PATENT DOCUMENTS 371775 11/1906 France .

Primary Examiner—Duane A. Reger
Attorney, Agent, or Firm—Cushman, Darby & Cushman

[57] ABSTRACT

A wedge-shaped wheel-blocking chock for a dual wheel truck is provided with a device for preventing unauthorized, premature displacement of the chock from a wheel-blocking relationship with a set of dual wheels of the truck. In particular, the top of the block body is provided with a rigidly mounted loop, eye or the like. A rigid generally horizontal T-bar or the like is provided, having at least one slot provided vertically, transversely through its center leg. In use the T-bar, oriented sideways is slipped between the wheels of a set of dual wheels, turned flat, and the cross-bar pulled against where the backs of both wheels meet the ground. The center leg slot is dropped over the loop, eye or the like and padlocked. A security chain is also disclosed for further preventing disassociation of the chock from a wheel-blocking relationship with the truck.

28 Claims, 3 Drawing Figures

U.S. Patent  Apr. 15, 1986  4,582,176
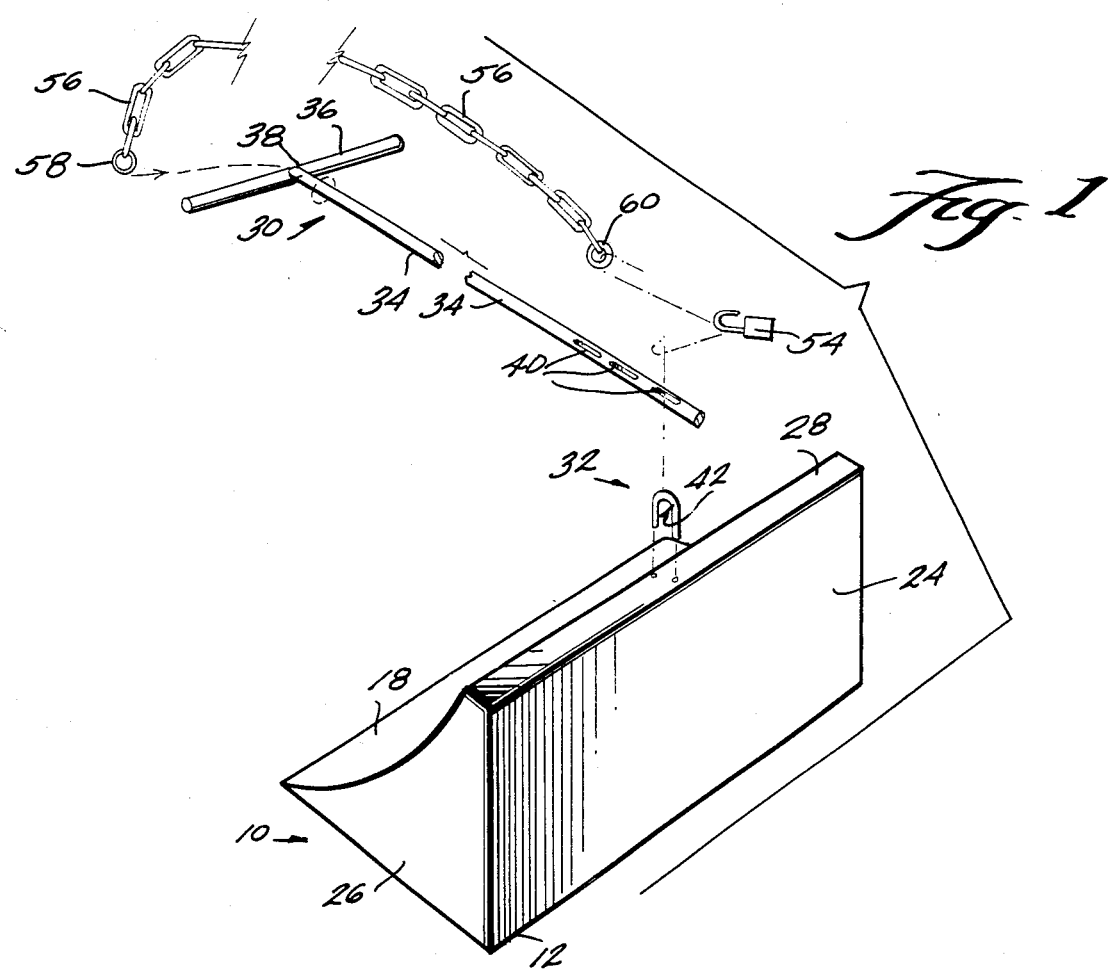
Fig. 1
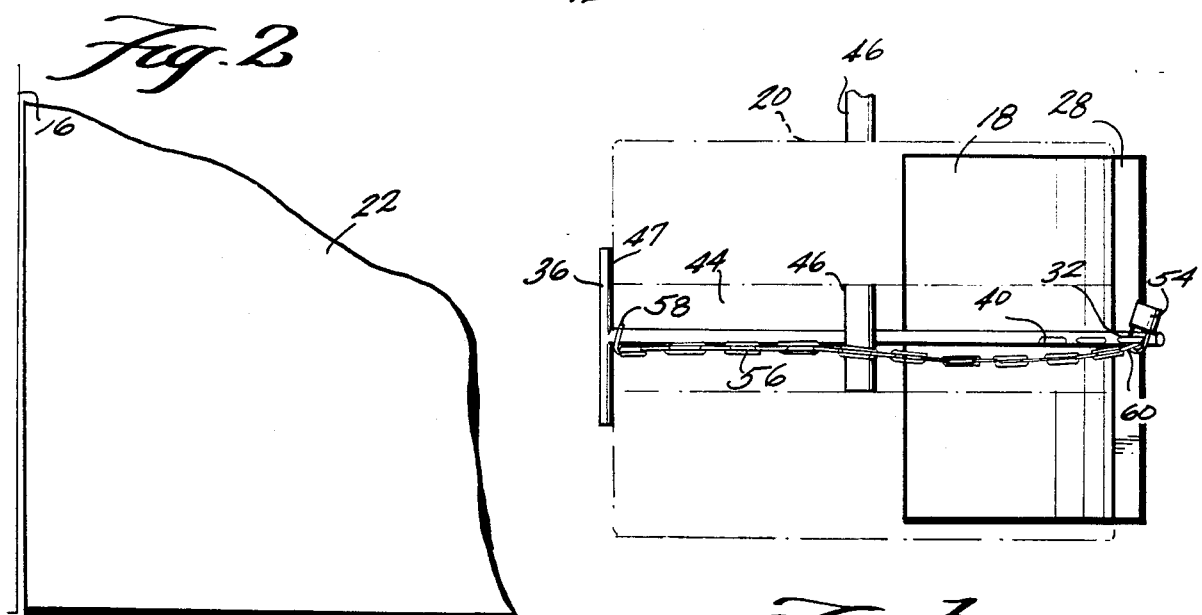
Fig. 2
Fig. 3

LOCKABLE CHOCK FOR DUAL WHEELS OF VEHICLE

BACKGROUND OF THE INVENTION

When a tractor-trailer or other truck is backed-up to a loading dock of a factory, warehouse or the like, it is now a general safety practice to place a wedge-shaped stop block or chock on the pavement, against the fronts of at least one left wheel and a least one right wheel. This is done so that while the trailer or other cargo container/support of the truck is being loaded or unloaded, the truck cannot roll forwards, or be driven away.

In the years before the use of wheel blocks became such a general safety practice, it occasionally happened that a truck driver upon returning to his or her vehicle and mistakenly concluding that loading/unloading operations were completed and that all loading/unloading personnel were clear of the cargo container, got in his or her cab and drove-off. At that time any person still engaged in loading/unloading the cargo container of the truck was likely to be injured, especially if they were at the time operating a fork-lift truck within the cargo container.

Fortunately, the widespread adoption and common use of wheel blocks has eliminated much of the safety problem.

However, there remains the possibility that someone would remove the wheel blocks from in front of the wheels of a truck before loading/unloading operations have been completed, and the truck roll forward or be driven off, with there then being almost the same likelihood for damage and injury as there would have been had no wheel blocks been used at all.

In the experience of the present inventor, when the wheel blocks are removed prematurely, it is usually done without care or authorization; for instance, the truck driver may mistakenly believe loading/unloading has been completed and become over-anxious to be on his or her way. Or the driver or a person assisting with the arrival of a newly arrived truck may "borrow" the blocks from under another truck at the loading dock, in the mistaken belief that the other truck has no further need for them.

In other cases, especially where a truck is left at a loading dock of a plant which is unattended or only lightly guarded overnight or over a weekend, thieves or vandals seeking to carry away anything accessible that is of conceivable value may steal the wheel blocks simply because they are so portable.

It has previously occurred to others that a way for preventing premature removal of wheel blocks from blocking relation to truck wheels is to establish some sort of tethering relationship between the blocks while they are in use, and the truck wheels or with some adjacent portions of the truck, and then provide a locking means for preventing that tethering relationship from being terminated without authorization. An example of a prior art solution is found in the U.S. Pat. No. 4,399,893, of Switzer, issued Aug. 23, 1983.

However, prior art proposals for solving the unauthorized, premature removal of chocks problem have tended to be mechanically complex and, particularly, not susceptible to adaptation to existing chocks, i.e. by retrofitting.

SUMMARY OF THE INVENTION

A wedge-shaped wheel-blocking chock for a dual wheel truck is provided with a device for preventing unauthorized, premature displacement of the chock from a wheel-blocking relationship with a set of dual wheels of the truck. In particular, the top of the block body is provided with a rigidly mounted loop, eye or the like. A rigid generally horizontal T-bar or the like is provided, having at least one slot provided vertically, transversally through its center leg. In use the T-bar, oriented sideways is slipped between the wheels of a set of dual wheels, turned flat, and the cross-bar pulled against where the backs of both wheels meet the ground. The center leg slot is dropped over the loop, eye or the like and padlocked. A security chain is also disclosed for further preventing disassociation of the chock from a wheel-blocking relationship with the truck.

The principles of the invention will be further discussed with reference to the drawing wherein a preferred embodiment is shown. The specifics illustrated in the drawings are intended to exemplify, rather than limit, aspects of the invention as defined in the claims.

BRIEF DESCRIPTION OF THE DRAWING

In the drawing:

FIG. 1 is an exploded perspective view of a lockable chock embodying principles of the present invention;

FIG. 2 is a fragmentary side elevation view of a truck at a loading dock, where a set of the dual wheels of the truck have been provided with the lockable chock of FIG. 1; and FIG. 3 is a fragmentary top plan view on line 3—3 of the FIG. 2 structure, with the truck wheels being shown in phantom lines.

DETAILED DESCRIPTION

Item 10 shown in FIG. 1 is a block body of a wheel blocking chock of generally wedge-shaped form. It has a generally horizontal, downwardly presented base surface 12 adapted and arranged to engage the pavement 14 by the loading dock 16 (FIG. 2), a rearwardly and upwardly presented oblique surface 18 (often cylindrically concavely curved, as shown) for engaging the lower front quadrant of the running surfaces (treads) of at least one and generally both of the tires of a set of dual wheels 20 of a truck 22 (FIG. 2), a generally vertical front surface 24 and generally vertical left and right side surfaces 26. A top is provided at 28 where the oblique surface 18 has its upper, foremost extent. This top may simply be an edge, but more often than not it is a generally horizontal, upwardly presented surface resulting from a truncation of the wedge shape.

The front and side surfaces 24, 26 of the block usually simply provide structural integrity to the block and are not engaged with the truck or the ground when the chock is in use, so the details of their shape and surface characteristics generally are unimportant. However, the shape and surface and orientation of the rear and base surfaces 18, 12 must be such as to permit the block to be shoved into a securely wedged relationship against the tire or tires, as shown in FIGS. 2 and 3. To that end, the base surface 12 preferably is constructed and adapted to permit the operator to shove the block along on the ground with his or her foot, and to kick the block into and, later, out of place without having to bend down or get down on all fours, yet make such good frictional contact with the pavement that when the block is in place the truck may not roll forwards or be driven forwards.

Typically, the block 10 would be fabricated of cut and welded steel or aluminum plate or made partly or wholly as a casting of aluminum, steel, iron or synthetic plastic resin.

All of the details of the block 10 as described so far are typical of chocks of the prior art, and, indeed, the block 10, if not in the course of being first made, may be a prior art chock, which is rather simply retrofitted to include the additional structure which will now be described.

The fundamentally needed further structure according to the principles of the present invention is a T-bar 30 and a mounting bracket 32.

The T-bar 30 is a unitary structure, rigid in tension, which includes a longitudinally-oriented central leg 34 and a transversally-oriented rear cross-bar 36. The T-bar 30 may be fabricated of metal pipe or bar, e.g. steel or (preferably) aluminum bar, of round or square cross-section, rigidly connected, e.g. by welding, at the juncture 38. The T-bar 30 typically has a thirty-six inch long central leg 34 and a cross-bar 36 which is at least twelve and preferably about sixteen inches long (measured transversally of the T-bar 30).

Near its front end, the T-bar 30 is provided with at least one cooperative securement feature 40, e.g. simply a slot formed transversally through the central leg 34. A longitudinally extending series of a plurality, e.g. three such slots 40 is shown formed vertically through the generally horizontally disposed T-bar 30. In this instance, the slots are shown being transversally narrow and longitudinally elongated.

The mounting bracket 32, in concept, is a cooperative securement feature provided on the top of the block 10 for lockable securement with a selected respective cooperative securement feature 40 of the T-bar 30. By preference, the mounting bracket 32 takes the form of an eye bolt, slotted ear, U-bolt, ring, U-bar, loop, bail or the like welded, bolted or otherwise secured or fixed on the top 28 of the block, preferably at least generally medially thereof, so as to provide a substantially fully perimetrically-defined opening 42 (i.e. a hole, not simply an open groove). In the presently preferred embodiment, the mounting bracket 32 is transversally narrow, longitudinally elongated, projects vertically upwardly from the top 28 of the block 10 and has its opening 42 oriented so as to open horizontally, transversally of the block 10. In horizontal transverse cross-section, the bracket 32 is shaped and sized to be received through a respective slot 40.

Referring to FIGS. 2 and 3, in use, the chock block 10 is conventionally installed against the bottom-fronts of a pair of dual wheels of a truck. (Although the chock is being shown used on the right side of the truck, on the front set of double dual wheels, in practice, often an identical chock would be installed in the same manner on comparable wheels on the left side of the truck.)

When the block 10 is in place as shown, the T-bar 30 (FIG. 1) is turned on edge, i.e. so that while the central leg 34 is generally horizontal, the cross-bar 36, disposed at the rear end of the central leg 34, is oriented generally vertically. In this orientation, the rear part of the T-bar 30 is slipped back in the space 44 between the inner and outer (i.e. the more medial and the more lateral) of the dual wheels 20, under the structure 46 by which these wheels 20 are mounted on the corresponding axle of the truck. The structure 46 which generally forms part of the axle but may in some instances be cooperatively formed by parts of the wheel hubs is generally of such a smaller diameter than the truck tires on these wheels, that the gap 44 is at least more than an inch wide up to about six inches wide, and at least somewhat more than sixteen inches high.

Once the cross-bar 36 has emerged behind the tires, the T-bar 30 is turned ninety degrees about its own longitudinal axis so that the cross-bar 36 is generally horizontal and its front 47 is oriented to engage the rear periphery 48 of the tires. Then the T-bar 30 is lowered at the rear until the cross-bar 36 rests on the pavement. Next, the central leg 34 is pulled forwards until the cross-bar 36 is disposed several inches in front of the rearmost extent of the tires at 50, and preferably even engages the tires at the rear of where they tread on the pavement at 52. Slight longitudinal movement of the T-bar 30 is made until a nearest slot 40 on the central leg 34 of the T-bar 30 is vertically aligned with the bracket 32, whereupon, the central leg 34 is lowered at the front until the bracket 32 enters the respective slot 40 from below and projects upwardly out of that slot with the front portion of the T-bar 30 resting on the top 28 of the block 10.

Finally, a padlock 54 is inserted through the bracket 32 opening 42 above the central leg 34 of the T-bar 30, and locked. In this state, the wheel chock cannot be inadvertently prematurely removed, without authorization, i.e. without access to a key destruction of the chock, or, intentionally driving over the chock.

In order to further impede the efforts of one who would intentionally remove the chock without authorization, or seek to drive away over the the chock, the structure of the present invention further may include a security chain 56. The security chain 56 includes a flexible, relatively inextensible length of steel link chain, steel cable or the like 56, such as often is used for locking bicycles to bicycle racks. At each end the flexible element 56 is shown provided with respective closed rings 58, 60. In instances where the security chain 56 is to be used as an added impediment, before the T-bar is turned on edge and slipped back between the tires, the central leg 34 of the T-bar is inserted through the ring 58. Then, after the T-bar 30 is in place with the bracket 32 inserted through the respective slot 40, the chain 56 is led through the gap 62 over the dual wheel-connecting structure 46, and the ring 60 is slipped over the bracket 32 and the padlock is installed through the opening 42, above the ring 60. (The padlock is, as a whole, sufficiently larger than the ring 60 so the ring 60 cannot be slipped off the bracket 32 over the padlock. In this state, the chock is tethered to the truck and cannot be non-destructively removed without authorization, i.e. without a key to the padlock.

Removal of the chock involves a simple reversal of the steps which are set forth above.

There are instances in which a chock would be used behind a set of dual wheels of a truck for preventing the truck from being able to roll or be driven to the rear, in which case the whole lockable chock of the invention would be installed from behind the wheels, turned end for end from orientation shown and described above, and removed in a reversal of its installation procedure.

It should now be apparent that the lockable chock for dual wheels of vehicle as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A locking device for preventing unauthorized, premature displacement of the wedge-shaped block of a wheel-blocking chock from a wheel-blocking relationship with a set of dual wheels of a truck, for use in an instance where the wheels are supported on a pavement with a gap laterally between such wheels above and below a central structure where the wheels are connected to an axle of the truck, said locking-device comprising:
a bracket adapted to be fixed on the block;
means defining a first cooperative securement structure on said bracket;
a T-bar including a longitudinally extending central leg affixed to a cross-bar, said cross-bar being longer than said gap is wide but operatively shorter than said gap is tall;
means defining at least one second cooperative securement structure on said central leg of said T-bar distally of said cross-bar;
said first and second cooperative securement structures being adapted to receive and be locked together by a padlock;
said T-bar being flatter than said gap is wide, so that said T-bar may be turned on edge and inserted rearwardly, cross-bar first, through said gap, under said central structure, then turned flat with said central leg distally of said cross-bar continuing to project forwardly of said gap and said cross-bar resting on the pavement;
said second cooperative securement structure being so located on said central leg relative to the length of said central leg, that as said T-bar, after being inserted rearwardly on edge through said gap and turned flat and said cross-bar resting on the pavement, the T-bar may be drawn forwardly until the cross-bar is disposed substantially forwardly of the rearmost extent of said wheels and in close proximity with said wheels, at which time the second cooperative securement structure may be juxtaposed with said first cooperative securement structure so that the first and second cooperative securement structures may be locked together by a padlock.

2. The locking device of claim 1, wherein:
said bracket is constituted by an upstanding member adapted to be fixed on top of the block; and
said first securement means is constituted by an opening formed through the upstanding member.

3. The locking device of claim 2, wherein:
the upstanding member is elongated longitudinally and is less thick transversally; and
said opening is oriented horizontally, transversally.

4. The locking device of claim 2, wherein:
the upstanding member is adapted to be welded onto the block.

5. The locking device of claim 2, wherein:
the upstanding member is adapted to be bolted onto the block.

6. The locking device of claim 1, wherein:
the T-bar is a unitary structure fabricated of metal pipe stock.

7. The locking device of claim 1, wherein:
the T-bar is a unitary structure fabricated of metal bar stock.

8. The locking device of claim 1, wherein:
the T-bar is a unitary structure fabricated of material that is practically inextensible in tension in conditions of use; and
said means defining at least one second cooperative securement structure on said central leg is constituted by at least one slot provided transversally through said central leg.

9. The locking device of claim 8, wherein:
each said slot is provided horizontally through said central leg.

10. The locking device of claim 9, wherein:
each said slot is elongated longitudinally of said central leg and is relatively less thick widthwise of said central leg.

11. The locking device of claim 9, wherein:
said at least one slot is constituted by a series of such slots which are spaced from one another longitudinally along said central leg distally of said cross-bar.

12. The locking device of claim 2, wherein:
the T-bar is a unitary structure fabricated of material that is practically inextensible in tension and conditions of use; and
said means defining at least one second cooperative securement structure on said central leg is constituted by at least one slot provided transversally through said central leg.

13. The locking device of claim 3, wherein:
each said slot is provided horizontally through said central leg; and
each said slot is elongated longitudinally of said central leg and is relatively less thick widthwise of said central leg.

14. The locking device of claim 13, wherein:
said upstanding member is adapted to be alternatively received, from below, through each of said slots so as to expose at least part of said opening above the respective slot for reception of said padlock therethrough.

15. The locking device of claim 14, further comprising:
a security chain including an elongated member which is practically inextensible in tension and has a first fastener provided at one end thereof and a second fastener provided at the other end thereof;
said first fastener being adapted to be secured on said T-bar adjacent said cross bar;
said second fastener being adapted to be effectively secured to said bracket by said padlock; and
said elongated member, between said first and second fasteners being contructed and arranged to extend through said gap above said central structure but below the upper extents of said wheels, so that when said security chain is in place and secured by said first and second fasteners, said block of said wheel-blocking chock cannot be non-destructively disassociated from the truck without unlocking said padlock.

16. The locking device of claim 15, wherein:
said elongated member is a flexible element.

17. The locking device of claim 16, wherein:
said elongated member is a length of a metal link chain; and said first and second fasteners are constituted by respective rings, of which the first is adapted to be slipped onto the central leg of the T-bar distally of said cross-bar and slid back towards proximity with the cross-bar prior to securement of the second of said rings to said bracket by the padlock.

18. The locking device of claim 1, further comprising:
a security chain including an elongated member which is practically inextensible in tension and has a first fastener provided at one end thereof and a second fastener provided at the other end thereof;
said first fastener being adapted to be secured on said T-bar adjacent said cross-bar;
said second fastener being adapted to be effectively secured to said bracket by said padlock; and
said elongated member, between said first and second fasteners being contructed and arranged to extend through said gap above said central structure but below the upper extents of said wheels, so that when said security chain is in place and secured by said first and second fasteners, said block of said wheel-blocking chock cannot be non-destructively disassociated from the truck without unlocking said padlock.

19. The locking device of claim 18, wherein:
said elongated member is a flexible element.

20. The locking device of claim 19, wherein:
said elongated member is a length of a metal link chain; and
said first and second fasteners are constituted by respective rings, of which the first is adapted to be slipped onto the central leg of the T-bar distally of said cross-bar and slid back towards proximity with the cross-bar prior to securement of the second of said rings to said bracket by the padlock.

21. The locking device of claim 14, further comprising:
a security chain including an elongated member which is practically inextensible in tension and has a first fastener provided at one end thereof and a second fastener provided at the other end thereof;
said first fastener being adapted to be secured on said T-bar adjacent said cross-bar;
said second fastener being adapted to be effectively secured to said bracket by said padlock; and
said elongated member, between said first and second fasteners being adapted to extend through said gap above said central structure but below the upper extents of said wheels, so that when said security chain is in place and secured by said first and second fasteners, said block of said wheel-blocking chock cannot be non-destructively disassociated from the truck without unlocking said padlock.

22. The locking device of claim 21, wherein:
said elongated member is a flexible element.

23. The locking device of claim 22, wherein:
said elongated member is a length of a metal link chain; and
said first and second fasteners are constituted by respective rings, of which the first is adapted to be slipped onto the central leg of the T-bar distally of said cross-bar and slid back towards proximity with the cross-bar prior to securement of the second of said rings to said bracket by the padlock.

24. A lockable chock, comprising:
a wheel-blocking chock including a wedge-shaped block adapted to be placed in wheel-blocking relationship with a set of dual wheels of a truck, for use in an instance where the wheels are supported on a pavement with a gap laterally between such wheels above and below a central structure where the wheels are connected to an axle of the truck; and
a locking device for preventing unauthorized, premature displacement of said block from said wheel-blocking relationship, said locking device including:
a bracket fixed on the block;
means defining a first cooperative securement structure on said bracket;
a T-bar including a longitudinally extending central leg affixed to a cross-bar, said cross-bar being longer than said gap is wide but operatively shorter than said gap is tall;
means defining at least one second cooperative securement structure on said central leg of said T-bar distally of said cross bar;
said first and second cooperative securement structures being adapted to receive and be locked together by a padlock;
said T-bar being flatter than said gap is wide, so that said T-bar may be turned on edge and inserted rearwardly, cross-bar first, through said gap, under said central structure, then turned flat with said central leg distally of said cross-bar continuing to project forwardly of said gap and said cross-bar resting on the pavement;
said second cooperative securement structure being so located on said central leg relative to the length of said central leg, that as said T-bar, after being inserted rearwardly on edge through said gap and turned flat and said cross-bar resting on the pavement, the T-bar may be drawn forwardly until the cross-bar is disposed substantially forwardly of the rearmost extent of said wheels and in close proximity with said wheels, at which time the second cooperative securement structure may be juxtaposed with said first cooperative securement structure so that the first and second cooperative securement structures may be locked together by a padlock.

25. The lockable chock of claim 24, further comprising:
a security chain including an elongated member which is practically inextensible in tension and has a first fastener provided at one end thereof and a second fastener provided at the other end thereof;
said first fastener being adapted to be secured on said T-bar adjacent said cross-bar;
said second fastener being adapted to be effectively secured to said bracket by said padlock; and
said elongated member, between said first and second fasteners being adapted to extend through said gap above said central structure but below the upper extents of said wheels, so that when said security chain is in place and secured by said first and second fasteners, said block of said wheel-blocking chock cannot be non-destructively disassociated from the truck without unlocking said padlock.

26. The lockable chock of claim 25, wherein:
said elongated member is a flexible element.

27. The lockable chock of claim 26, wherein:
said elongated member is a length of a metal link chain; and said first and second fasteners are constituted by respective rings, of which the first is adapted to be slipped onto the central leg of the T-bar distally of said cross-bar and slid back towards proximity with the cross-bar prior to securement of the second of said rings to said bracket by the padlock.

28. The lockable chock of claim 27, wherein:

said bracket is constituted by an upstanding member adapted to be fixed on top of the block; and said first securement means is constituted by an opening formed through the upstanding member;

the T-bar is a unitary structure fabricated of material that is practically inextensible in tension in conditions of use; and said means of defining at least one second cooperative securement structure on said central leg is constituted by at least one slot provided transversally through said central leg;

each said slot is provided horizontally through said central leg;

each said slot is elongated longitudinally of said central leg and is relatively less thick widthwise of said central leg; and said upstanding member is adapted to be alternatively received, from below, through each of said slots so as to expose at least part of said opening above the respective slot for reception of said padlock therethrough.

* * * * *